(12) United States Patent
Lee

(10) Patent No.: US 9,481,332 B1
(45) Date of Patent: Nov. 1, 2016

(54) PLUG-N-PLAY POWER SYSTEM FOR AN ACCESSORY IN AN AIRCRAFT

(71) Applicant: The Boeing Company, Chicago, IL (US)

(72) Inventor: Donald B. Lee, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 692 days.

(21) Appl. No.: 13/918,638

(22) Filed: Jun. 14, 2013

(51) Int. Cl.
*B60L 1/00* (2006.01)
*B60R 16/023* (2006.01)

(52) U.S. Cl.
CPC ................. *B60R 16/0239* (2013.01)

(58) Field of Classification Search
USPC ........................................................ 307/9.1
See application file for complete search history.

(56) References Cited

U.S. PATENT DOCUMENTS

| | | |
|---|---|---|
| 5,589,834 A | 12/1996 | Weinberg |
| 5,923,289 A | 7/1999 | Buer et al. |
| 6,359,599 B2 | 3/2002 | Apostolos |
| 6,424,313 B1 | 7/2002 | Navarro et al. |
| 6,448,938 B1 | 9/2002 | Chiang et al. |
| 6,825,815 B1 | 11/2004 | Harmon |
| 7,034,748 B2 | 4/2006 | Kajiya |
| 7,202,830 B1 | 4/2007 | Brown et al. |
| 7,260,141 B2 | 8/2007 | Bierly et al. |
| 7,397,425 B2 | 7/2008 | Ranta et al. |
| 7,597,286 B2 | 10/2009 | Lee |
| 7,609,205 B2 | 10/2009 | Haskell |
| 8,128,027 B2 | 3/2012 | Lee |
| 8,245,969 B2 | 8/2012 | Lee |
| 2003/0043071 A1 | 3/2003 | Lilly et al. |
| 2007/0097006 A1 | 5/2007 | Brown et al. |
| 2011/0184579 A1* | 7/2011 | Nilsen ............. H02J 3/14 700/295 |
| 2013/0295782 A1* | 11/2013 | Goel ............... H01R 13/703 439/40 |

* cited by examiner

*Primary Examiner* — Rexford Barnie
*Assistant Examiner* — Dru Parries
(74) *Attorney, Agent, or Firm* — Toler Law Group, PC (57) ABSTRACT

A power system for an aircraft is disclosed. The power system comprises a power panel, at least one power rail coupled to the power panel, wherein the power rail is integrated with a mounting rail for the passenger service unit, and at least one universal serial bus (USB) port coupled to the power panel and mounted in the passenger service unit.

20 Claims, 8 Drawing Sheets

PLUG-N-PLAY POWER SYSTEM FOR AN ACCESSORY IN AN AIRCRAFT

RELATED APPLICATIONS

None

FIELD OF THE DISCLOSURE

The present invention relates generally to an aircraft and more specifically to a power system for accessories in the aircraft.

BACKGROUND

In today's commercial airplanes, a power system for accessories such as laptop or notebook computer has complex power, delivery and discrete wiring, and is difficult to install. When a power system unit needs to be moved or replaced, it can take several minutes to accomplish the job based upon the complexity of the system. When this move or replace is associated with a seat repitch or retrofit within the aircraft, a great deal of time can be lost. Accordingly, it is desired to provide for the installation and removal of power system for accessories without the difficulties and time loss associated with the conventional overhead video passenger service.

Accordingly, what is needed is a system and method for providing a simple, lightweight and reliable power system unit in an aircraft. The present invention addresses such a need.

SUMMARY

In some embodiments a vehicle comprises at least one seat assembly, a passenger service unit disposed above the at least one seat assembly and at least one universal serial bus (USB) port located in the passenger service unit.

In some embodiments a power system for a passenger service unit for a vehicle comprises a power source, at least one power rail coupled to the power source, wherein the power rail is integrated with a mounting rail for the passenger service unit, and at least one universal serial bus (USB) port coupled to the power source and mounted in the passenger service unit.

In some embodiments a method to operate a power system for a passenger service unit in a vehicle comprises providing power to a universal serial bus (USB) port mounted in a passenger service unit on a vehicle and in response to a signal, automatically ejecting a USB connector from the USB port.

DETAILED DESCRIPTION

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
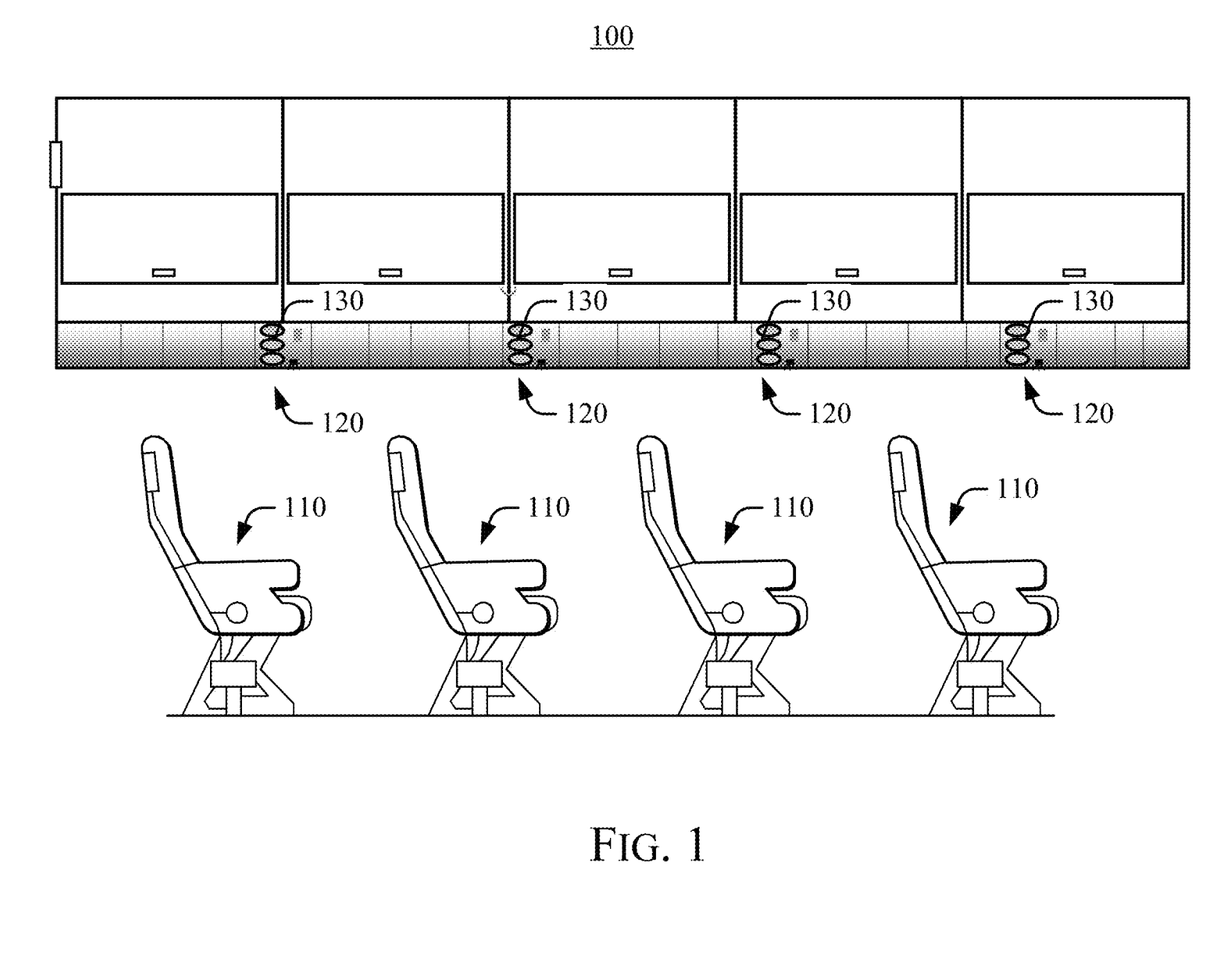
FIG. 1 illustrates a schematic diagram of a cabin environment in accordance with embodiments.

FIG. 1 illustrates a schematic diagram of a cabin environment in accordance with embodiments. Referring to FIG. 1, in some embodiments a cabin environment 100 may comprise at least one seat assembly 110, a passenger service unit 120 disposed above the at least one seat assembly 110, and at least one universal serial bus (USB) port 130 located in the passenger service unit 120. By way of example, in some embodiments the cabin environment 100 may represent an interior cabin environment in a vehicle such as an aircraft, a watercraft, or a land-based vehicle such as a bus or a train.

In some embodiments the passenger service unit 120 modules may include one or more of the following functionalities: a flight attendant call light, a reading light, personal air outlets, oxygen, an entertainment system control such as video or audio channel selection, and cabin signage such as "fasten seat belt", "no smoking" or other passenger information. It should be understood by one of ordinary skill in the art that a variety of other functions could be included and their use would be within the spirit and scope of the present embodiment.

In some embodiments, passenger service units 120 may utilize the following features to allow it to easily snap onto a mounting rail in an aircraft without wire, duct or tube hookups: a 12V DC powered mounting rail, wireless technology, and fans mounted onto a passenger service unit.

The passenger service unit mounting rail provides both a structural interface for installing a passenger service unit as well as an electrical power interface. Each passenger service unit 120 may simply snap onto the mounting rail for both mechanical attachment and for electrical power.

Figure 2A:
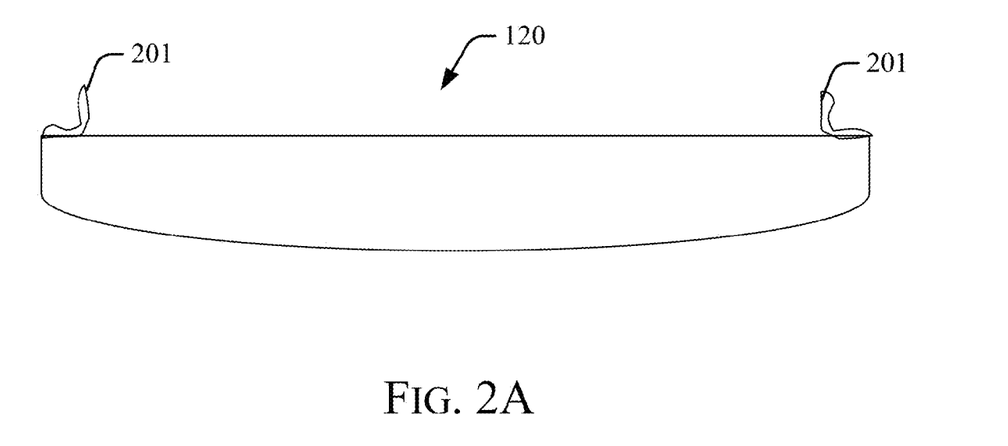
FIG. 2A is a view of an embodiment of a power system in accordance with embodiments.
Figure 2B:
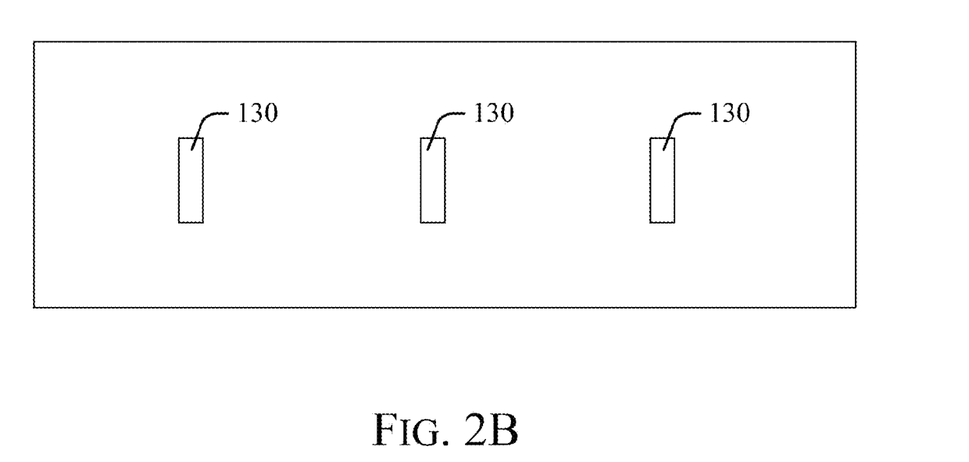
FIG. 2B is a block diagram of one embodiment of a power module unit in accordance with embodiments.

FIG. 2A is a side view of an embodiment of a passenger service unit 120 and FIG. 2B is a block diagram of one embodiment of a section of a passenger service unit 120 in accordance with embodiments. Referring to FIGS. 2A-2B, a passenger service unit 120 may be mounted on structural bin rails that double as power rails 201. The rails 201 provide power to the passenger service unit 120. Referring to FIG. 2B, in some embodiments the passenger service unit 120 may comprise at least one USB port 130.

In some embodiments a Simplified Overhead Electronics Unit (SOEU) may be employed to convert power inputs into a "safe-to-touch" power output (such as 12V DC or 5V DC), to switch the outputs from being powered by the non-essential power input to being powered by the essential power input whenever the essential bus becomes live, and to reverse the polarity of the outputs when the essential bus becomes live.

Figure 3:
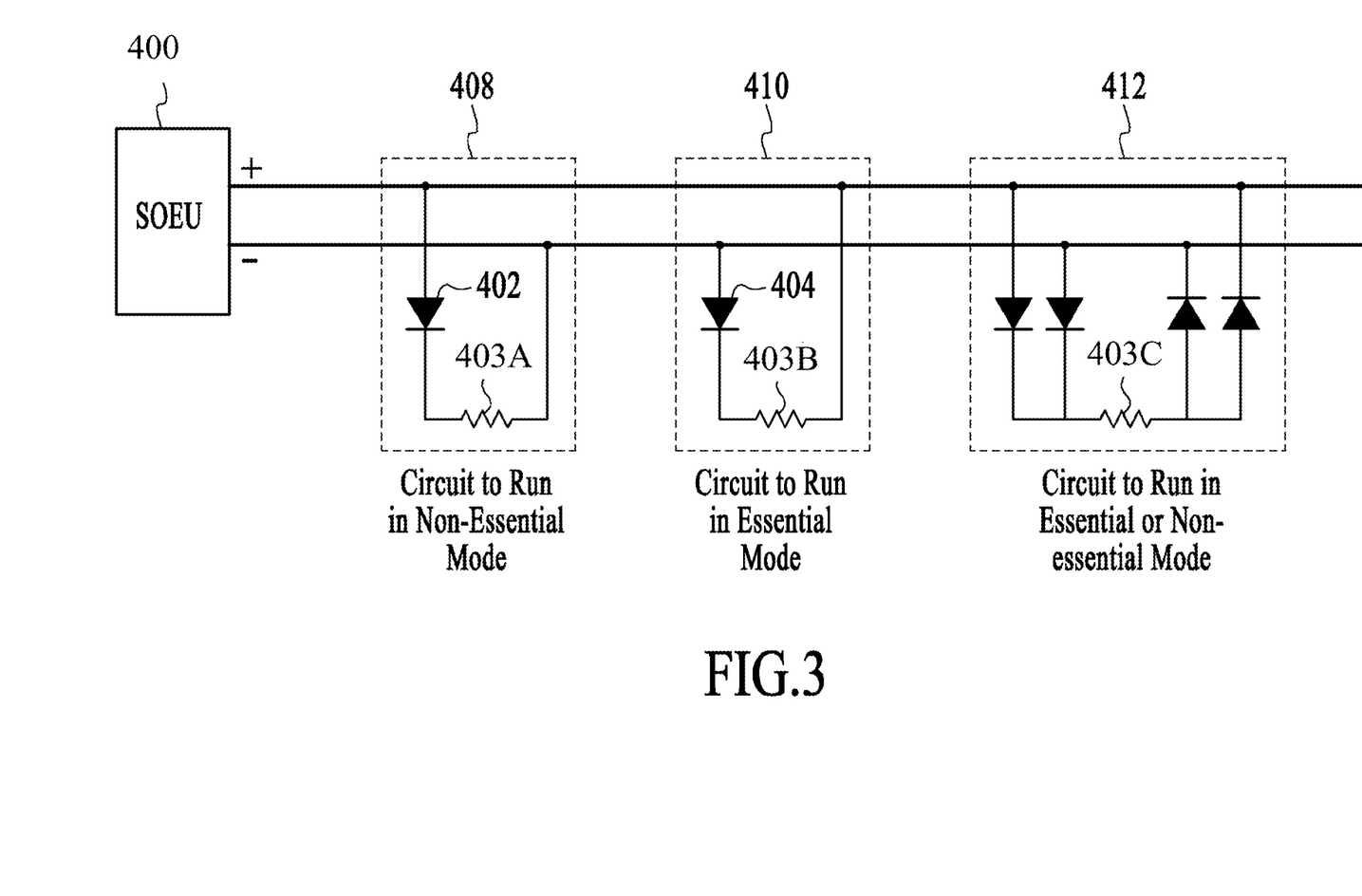
FIG. 3 is a diagram that illustrates the operation of passenger service unit mounting rails with circuits connected thereto.

FIG. 3 is a diagram that illustrates the operation of the passenger service unit mounting rails 201 with passenger service unit circuits as indicated by loads 403A, 403B and 403C connected thereto. As is seen, under normal operating conditions, a diode 402 in series with each passenger service unit module circuit allows current to flow through non-essential circuits 408. Non-essential circuits and related functions are, for example, circuits for in-flight entertainment monitors, reading lights and flight attendant call lights. For essential circuits 410, such as one for oxygen deployment, a diode 404 in series prevents current from flowing into the circuit. Thus, under non-normal operating conditions, such as during emergency oxygen deployment, the output of the simplified overhead electronics unit 400 reverts from a non-essential power mode to an essential power mode and the output polarity is reversed. Thus, the diodes 402 on the non-essential circuits prevent current to flow through them while the diodes 404 on the essential circuits now allow current to flow through them. This can be used, for example, to momentarily power a solenoid that opens an oxygen mask door thus allowing oxygen masks to fall into the cabin, or, for example, to continuously power a wirelessly activated oxygen system.

Note that if a circuit 412 requires power during both normal and non-normal conditions, diodes may be used to provide power to the circuit 412 under either condition. Also note that if the circuit 412 could operate with either polarity, no diodes would be necessary and the circuit may be connected to each of the rails.

In one implementation, the 12V DC mounting rail contact and the current return contact may be widely spaced. In this implementation, such a design helps to prevent accidental shorting across the contacts with, e.g., a conductive tool that might otherwise startle a mechanic by discharging sparks. Additionally, all portions of the passenger service unit mounting rails that cannot be contacted by the electrical contact of the passenger service unit may be made from non-conductive materials or finished with non-conductive finishes as another preventive measure against accidental shorting.

The passenger service unit power rail may implement any low voltage power type, AC or DC. Many power rail designs other than that shown in FIG. 3 are feasible. For example, the male spring contact may be moved to the passenger service unit with the female contact inserted into a groove in the mounting rail arm. In this case, both the 12V DC and return rails may be located on the same side of the passenger service unit (instead of opposite sides) since both mounting rail contacts can be recessed protecting them from accidental shorting with, e.g., a conductive tool.

Figure 4:
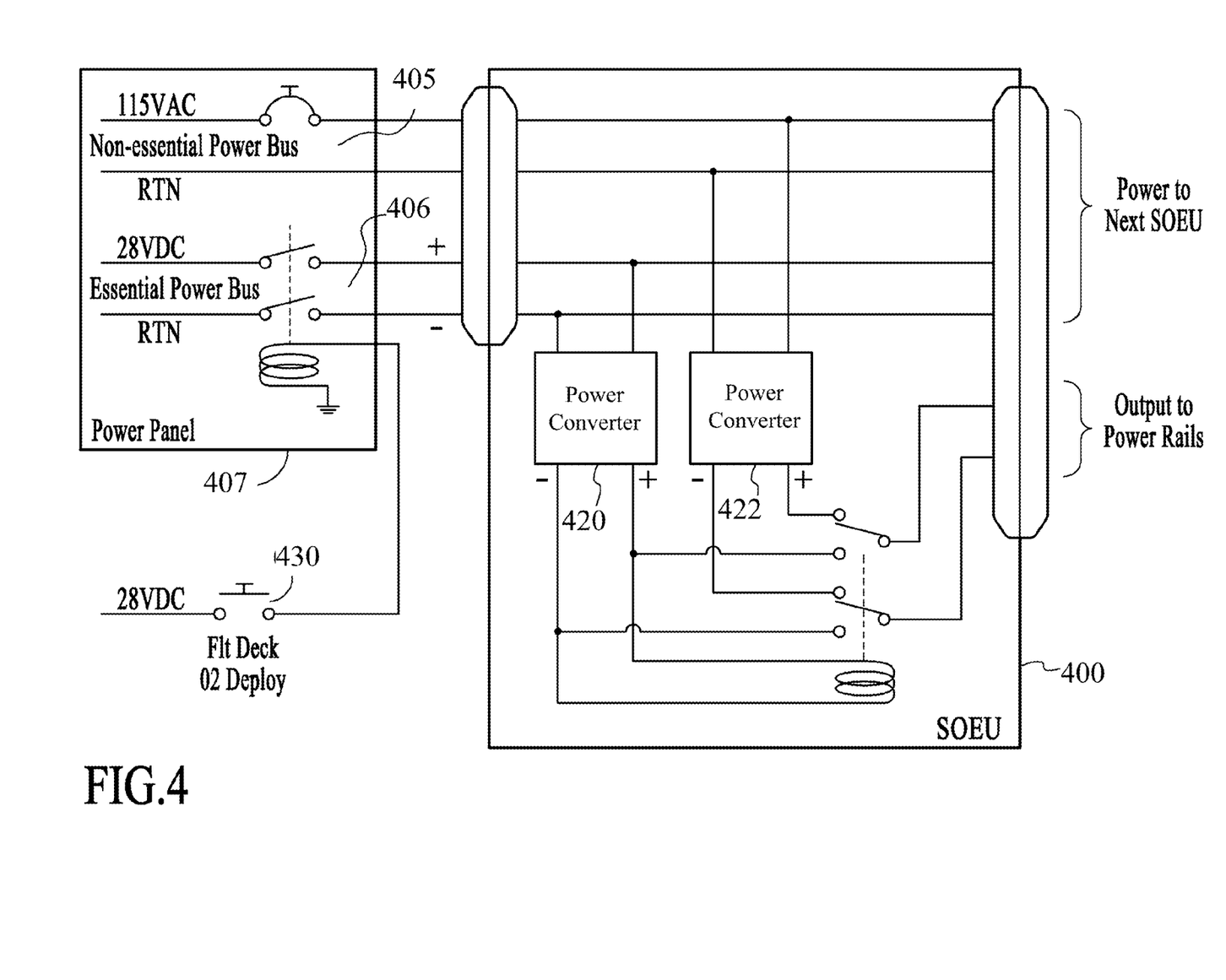
FIG. 4 is an example of a simplified wireless overhead electronics unit.

FIG. 4 is an embodiment of a simplified overhead electronics unit (SOEU) 400. As is seen, a power panel 407 provides power to the simplified overhead electronics unit 400 via a non-essential power bus 405 and/or an essential power bus 406. In this embodiment the non-essential power bus 404 may be 115 VAC and the essential power bus 406 may be 28 VDC. The simplified overhead electronics unit 400 may include a first converter 420 for converting the essential voltage from in this embodiment 28 VDC to 12 VDC and a second converter 422 for converting the essential voltage bus from 115 VAC to 12 VDC. The simplified overhead electronics unit 400 may be typically mounted on the stow bin assembly. In this example, only power from the non-essential power bus 404 inputs are being used to create the 12 VDC output under normal operating conditions (when the essential bus 406 is not live). When the essential power bus 406 becomes live, a relay may be energized to switch the output from being driven by the non-essential power bus 404 to being driven by the essential power bus 406 input. Note that the output polarity will be reversed relative to the normal operating condition when this occurs.

In this example:

The non-essential power bus 405 may be 115 VAC and may be transformed to 5 VDC by an AC-to-DC converter 420 within the simplified overhead electronics unit 400.

The non-essential power bus 405 may also be turned off without turning on the essential power bus 406 by opening a circuit breaker or relay, typically located in a power panel.

The essential power bus 406 may be 28 VDC and may be converted to 12 VDC by a DC-to-DC converter 420 within the simplified overhead electronics unit 400.

The essential power bus 406 may typically be turned on via a relay typically located in a power panel. The relay may, for example, be activated by a switch 430 in the Flight Deck, such as for emergency oxygen deployment.

The power buses may be fed through the simplified overhead electronics unit 406 for installation convenience. This may allow several simplified overhead electronic units 400 to be daisy chained together down the airplane.

There are several ways to accomplish the simplified overhead electronics unit 400 functionality. The example circuit shown in FIG. 4 is just one way to implement this function.

Figure 5:
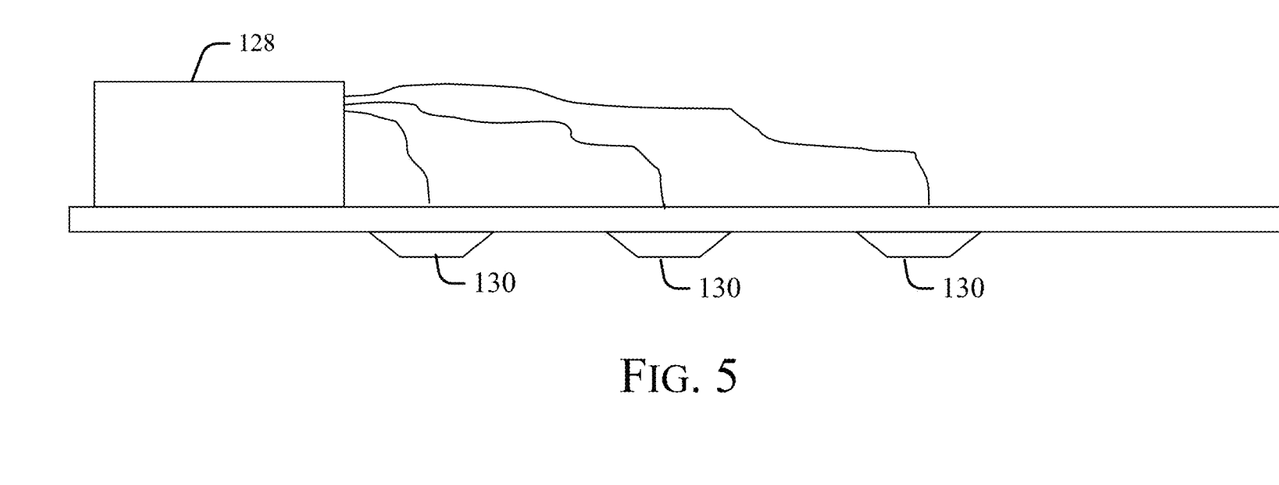
FIG. 5 is a schematic illustration of a portion of a passenger service unit module.

Referring to FIG. 5, a module 128 on the passenger service unit 120 senses the load on the USB ports 130 and may provide power conditioning to the three universal serial bus (USB) outlets 130 limiting the current sourced to each outlet to a predetermined current level, typically between 900 milliamps (mA) and 2.0 amps. In this embodiment, the three power outlets may provide 5 VDC. The USB outlets 130 may be configured with pins 2 and 3 tied together to provide a loop-back to an electronic device that indicates that the USB outlet is a charging socket. Pin 1 is defined as +5V DC while pin 4 is the return pin.

The power module 128 may condition the power and distribute the power to the USB ports 130. Accordingly, the power supply may provide power to an accessory portable device on the aircraft such as a laptop computer, notebook computer, personal digital assistant, portable phone, MP3 player, IPOD or the like.

In some embodiments the passenger service unit 120 may include an automatic ejection feature for USB connectors to reduce the likelihood that USB power cords will interfere with egress from a seat or with oxygen mask drop. In such embodiments the USB Sockets in the Accessory Power PSU Panel incorporate an automatic ejection feature that releases the passenger provided USB power cord and pushes the plug out of the USB socket, allowing it to drop free from the panel to allow for egress and access to the oxygen mask.

Figure 6:
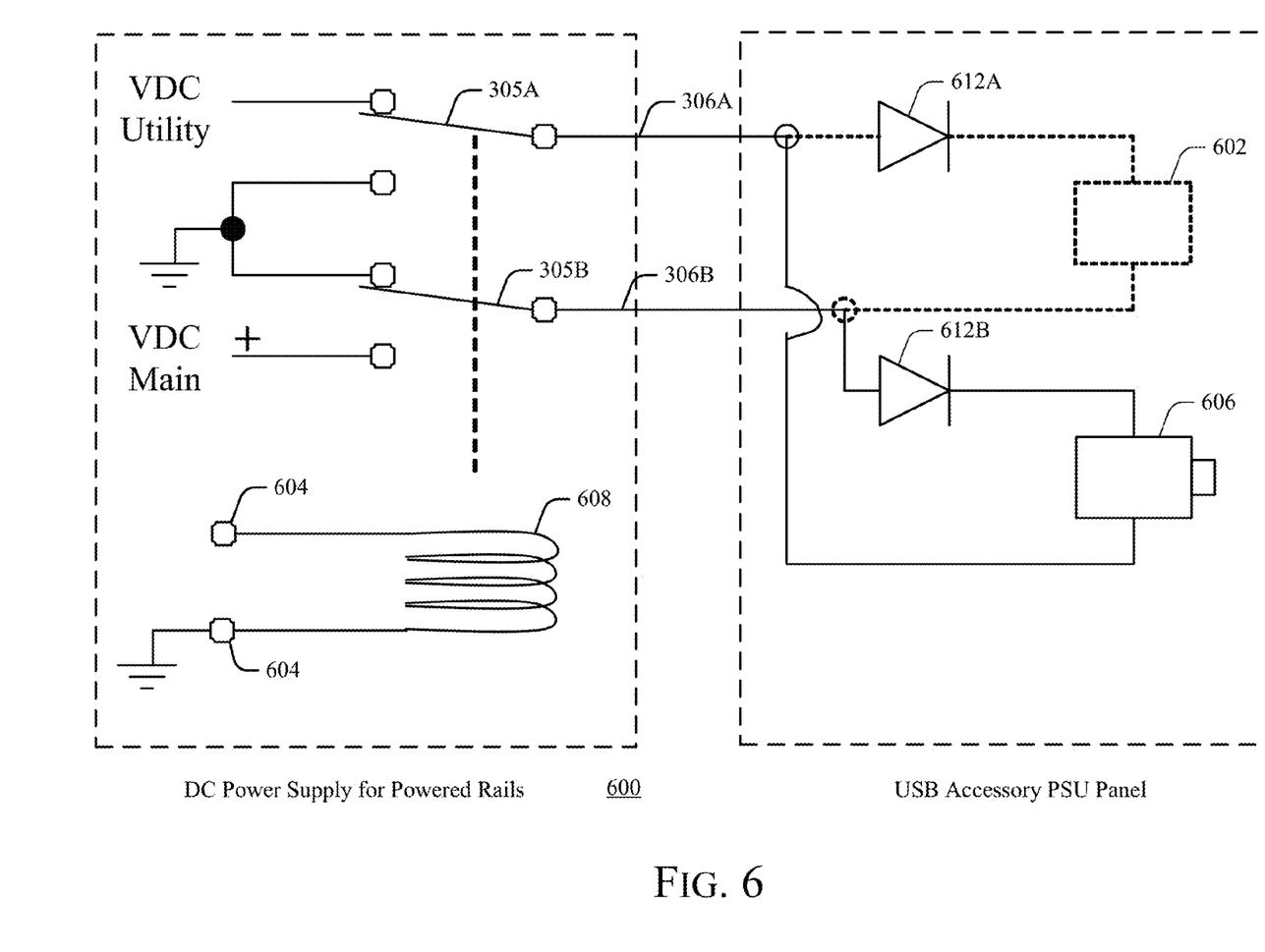
FIG. 6 is a block diagram of the embodiment of a power switching system for use with the power module unit.
Figure 7:
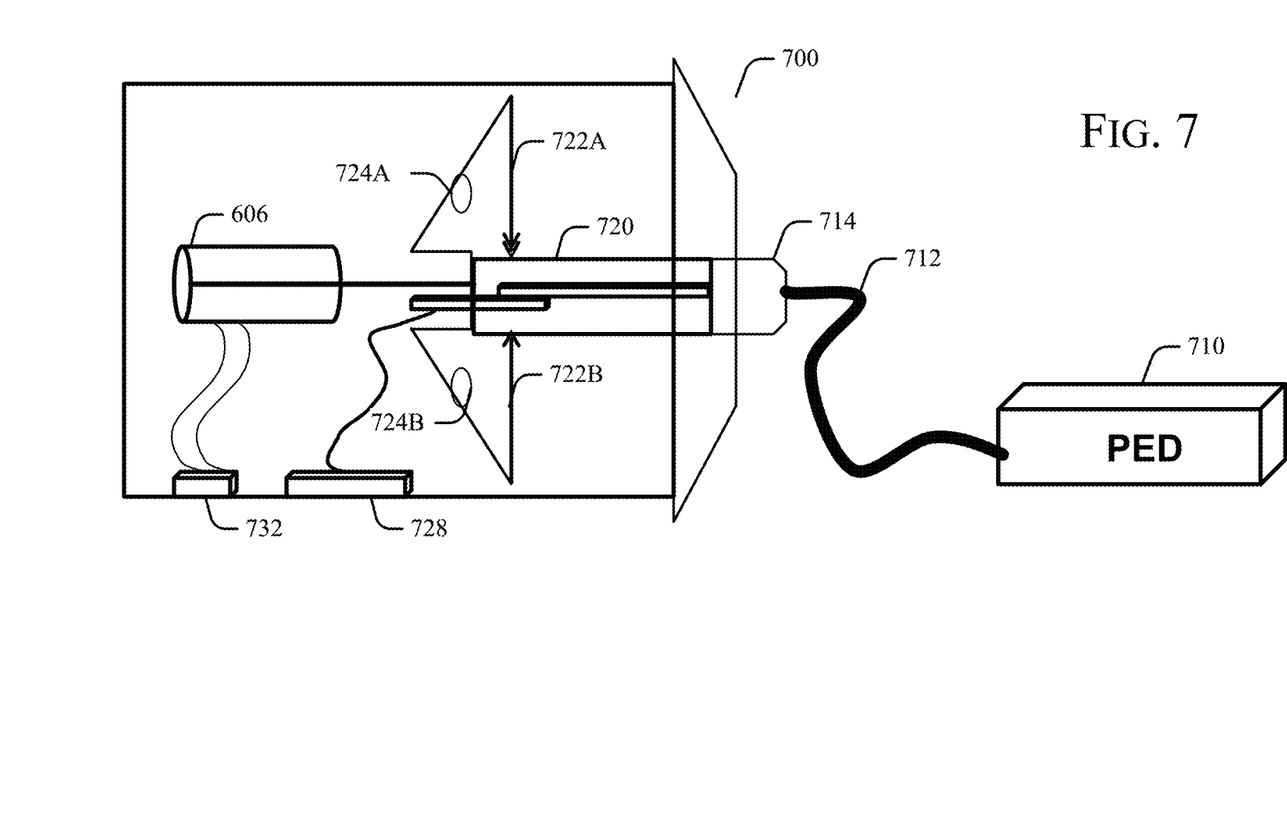
FIG. 7 is a block diagram of an automatic ejector assembly for a universal serial bus (USB) connector, according to embodiments.

Operation of the automatic ejection feature will be explained with reference to FIGS. 6-7. FIG. 6 is a block diagram of the embodiment of a power switching system 600 for use with a power module unit 602 in accordance with a number of embodiments, and FIG. 7 is a block diagram of an automatic ejector assembly 700 for a universal serial bus (USB) connector, according to embodiments.

Referring first to FIG. 6, the power switching system 600 may utilize a relay 608 (either a mechanical or a solid state) to switch the circuit between two operating states. In the first operating state referred to herein as the "normal" operating state. In the normal operating state the power rails 201 power supply supplies voltage and current to the powered rails with its output DC(+) voltage line connected to rail 306A and its DC(−) voltage line connected to rail 306B. This energizes the PSU panel and supplies DC voltage to the PEDs power module 602 integrated into the back of the USB accessory PSU panel through a diode 612A. The diode 612A connected to rail 306A only allows current and voltage to be supplied to the PEDs Power Module during "normal" airplane operation. A second diode 612B is connected to rail 306B and in series with a solenoid 606 prevents current and voltage from being supplied to the second solenoid during "normal" airplane operation.

Since the power module unit 602 may share the power rails 306a-306b with the oxygen passenger service unit (not shown), each power module unit 602 may be protected by diode 612A to prevent power from being applied to the power system 602 while oxygen may be deployed.

In this system, the power rails 306A-306B may also double as the oxygen mask deploy wiring. The oxygen deploy discrete output 604 may be tied to the relay coil 608. When oxygen is commanded, the relay 608 may be energized which pulls down switches 305A, 305B and 12 VDC power from the primary bus may be routed to the power rails 306A-306B in reverse polarity, causing the USB auto eject connector solenoid 606 to be energized. The diode 612A connected to rail 306A now prevents current and voltage from being supplied to the PEDs power module 602, turning off the PEDs power module 602. The second diode 612B connected to rail 306B and in series with the solenoid 606 allows current and voltage to be supplied to the solenoid 606 during "emergency" airplane operation. The details of one embodiment of an oxygen deployment system are described, for example, in U.S. Pat. No. 7,597,286 entitled "Simplified Power System for a Cabin Services System for an Aircraft", filed on Dec. 16, 2005, assigned to the assignee of the present embodiment, and incorporated by reference herein.

Figure 8:
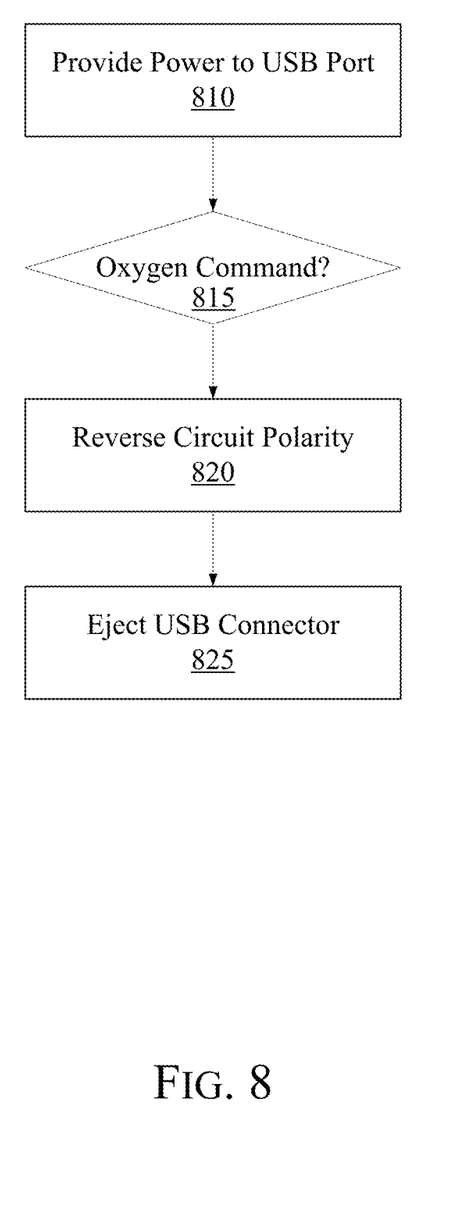
FIG. 8 is a flowchart illustrating operations in a method to operate a power system for a passenger service unit, according to embodiments.

In some embodiments the solenoid 606 may function to automatically eject a USB connector from a USB port in the PSU. Referring to FIGS. 7-8, in some embodiments a passenger's personal electronic device(s) 710 maybe coupled to a USB port in the passenger service unit by a USB cord 712 having a USB connector 714 which mates with the USB port 130, indicated by 720. The USB connector may be connected to a USB data connection 728 and the system may be operated to provide power to the USB port 130.

The USB connector may be retained in place by springs 722A, 722B which are secured to respective fixed pivot points 724A, 724B such that the springs 722A, 722B are pivotable between a first position, illustrated in FIG. 7, in which the springs are hooked against the USB connector 714 to retain the connector 714 in the port 720, and a second position in which the springs are retracted from the USB connector 714.

Solenoid 606 is coupled to power supply 732 as describe above with reference to FIG. 6. In normal operating mode the solenoid 606 is not active. When an oxygen command is triggered (operation 815) the power switching system 600 relay coil 608 switches the circuit polarity (operation 829) which activates the solenoid 606, which in turn presses against the base 726 of the springs 722A, 722B causing the springs 722A, 722B to pivot about fixed pivot points 724A, 724B such that the USB connector 714 is released. Further pressure from solenoid 806 ejects (operation 825) the USB connector 714 from the port 720. Thus, activating the oxygen system automatically ejects the USB connector 714 from the port 720 such that the USB cord 712 does not interfere with the oxygen masks when they drop.

Many other embodiments of this system are possible:

In addition, separate power rails may be added to the stowage bin assembly, parallel to the passenger service unit mounting rails, in order to provide the electrical power function.

This system does not rely on wireless data communication to the passenger service unit modules. Other communication options may include traditional wires or communications over power line (COPL) technologies.

Circuits that need to operate when power is completely shut off from the rails may include a battery or capacitor that is charged via the rails during normal operation.

The power rail may use any of low voltage power type, AC or DC. Many power rail and electrical contact designs other than that shown in FIG. 5 are feasible.

Accordingly, a system and method in accordance with the embodiment provides an overhead video system that is integrated with a passenger service unit power rail to provide a modular system. As a result, the overhead system can be installed and replaced in an efficient fashion.

Although the present embodiment has been described in accordance with the embodiments shown, one of ordinary skill in the art will readily recognize that there could be variations to the embodiments and those variations would be within the spirit and scope of the present embodiment. For example, implementations of a cabin services system described above can be implemented in any type of commercial vehicles including, e.g., helicopters, passenger ships, automobiles, and so on. Accordingly, many modifications may be made by one of ordinary skill in the art without departing from the spirit and scope of the appended claims. Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A vehicle, comprising:
    at least one seat assembly;
    a passenger service unit proximate to the at least one seat assembly, the passenger service unit comprising a first set of devices and a second set of devices;
    a universal serial bus (USB) port located in the passenger service unit;
    a first circuit coupled to a power rail to, when activated, provide power from the power rail to the first set of devices of the passenger service unit; and
    an automatic ejector assembly to automatically eject a USB connector from the USB port when the first circuit is activated.

2. The vehicle of claim 1, wherein the first circuit is activated when electricity of the power rail has a first polarity.

3. The vehicle of claim 2, further comprising a second circuit coupled to a second power rail to, when activated, provide power from the second power rail to the second set of devices, wherein the second circuit is activated when the electricity has a second polarity different than the first polarity.

4. The vehicle of claim 1, further comprising an overhead electronics unit, wherein the overhead electronics unit comprises:
a first converter to convert power from a first power bus from 115V AC to 12V DC, the first power bus coupled to the power rail;
a second converter to convert power from a second power bus from 28V DC to 12V DC, the second power bus coupled to the power rail; and
a relay to switch power output from the first power bus to the second power bus when the first power bus is energized.

5. The vehicle of claim 1, wherein the first circuit includes a first diode that couples the power rail to the first set of devices.

6. The vehicle of claim 5, further comprising a second circuit coupled to the power rail to, when activated, provide power from the power rail to the second set of devices, wherein the second circuit includes a second diode that couples a second power rail to the second set of devices, and wherein the second power rail has a different polarity than the power rail.

7. The vehicle of claim 1, wherein the automatic ejector assembly comprises a solenoid coupled to the first circuit and operative to eject the USB connector from the USB port when the first circuit is activated.

8. The vehicle of claim 7, wherein the automatic ejector assembly comprises opposing springs to retain the USB connector in the USB port.

9. A power system for a passenger service unit for a vehicle, comprising:
a power panel;
a power rail coupled to the power panel, wherein the power rail is integrated with a mounting rail for the passenger service unit, the passenger service unit comprising a first set of devices and a second set of devices;
a universal serial bus (USB) port coupled to the power panel and mounted in the passenger service unit;
a first circuit coupled to the power rail to, when activated, provide power from the power rail to the first set of devices of the passenger service unit; and
an automatic ejector assembly to automatically eject a USB connector from the USB port when the first circuit is activated.

10. The power system of claim 9, further comprising a second circuit coupled to a second power rail to, when activated, provide power from the second power rail to the second set of devices.

11. The power system of claim 10, wherein the first circuit is electrically connected to the power rail when electricity of the power rail has a first polarity.

12. The power system of claim 11, wherein the first circuit includes a first diode that couples the power rail to the first set of devices when electricity of the power rail has the first polarity.

13. The power system of claim 12, wherein the second circuit includes a second diode that couples the second power rail to the second set of devices when second electricity of the second power rail has the first polarity, and wherein a polarity of the second power rail is opposite a polarity of the power rail.

14. The power system of claim 13, wherein the first set of devices comprises an essential device, and wherein the second set of devices comprises a non-essential device.

15. The power system of claim 9, wherein the automatic ejector assembly comprises a solenoid coupled to the first circuit and operative to eject the USB connector from the USB port when the first circuit is activated, and wherein the automatic ejector assembly comprises opposing springs to retain the USB connector in the USB port.

16. A method comprising:
providing power to a universal serial bus (USB) port mounted in a passenger service unit on a vehicle, the passenger service unit comprising a first set of devices and a second set of devices;
electrically coupling a first circuit to a mounting rail to provide power to the first set of devices of the passenger service unit while electrically coupled to the mounting rail; and
in response to electrically coupling the first circuit to the mounting rail, ejecting a USB connector from the USB port.

17. The method of claim 16, further comprising reversing a polarity of the mounting rail.

18. The method of claim 17, wherein the first circuit is electrically coupled to the mounting rail in response to the polarity reversing.

19. The method of claim 17, further comprising electrically decoupling a second circuit from the mounting rail, wherein the second circuit provides power to the second set of devices while electrically coupled to the mounting rail, wherein the second circuit is electrically decoupled from the mounting rail in response to the polarity reversing.

20. The method of claim 16, wherein the USB connector is ejected via activating a solenoid, and wherein the solenoid releases a spring.

* * * * *